(No Model.) J. Q. ADAMS.
FEED CUTTER.

No. 565,417.  Patented Aug. 11, 1896.

2 Sheets—Sheet 1.

Witnesses
C. F. Blake
A. A. Murray

Inventor
John Q. Adams.
By Coburn & Thacher
Attys.

(No Model.) 2 Sheets—Sheet 2.
J. Q. ADAMS.
FEED CUTTER.
No. 565,417. Patented Aug. 11, 1896.
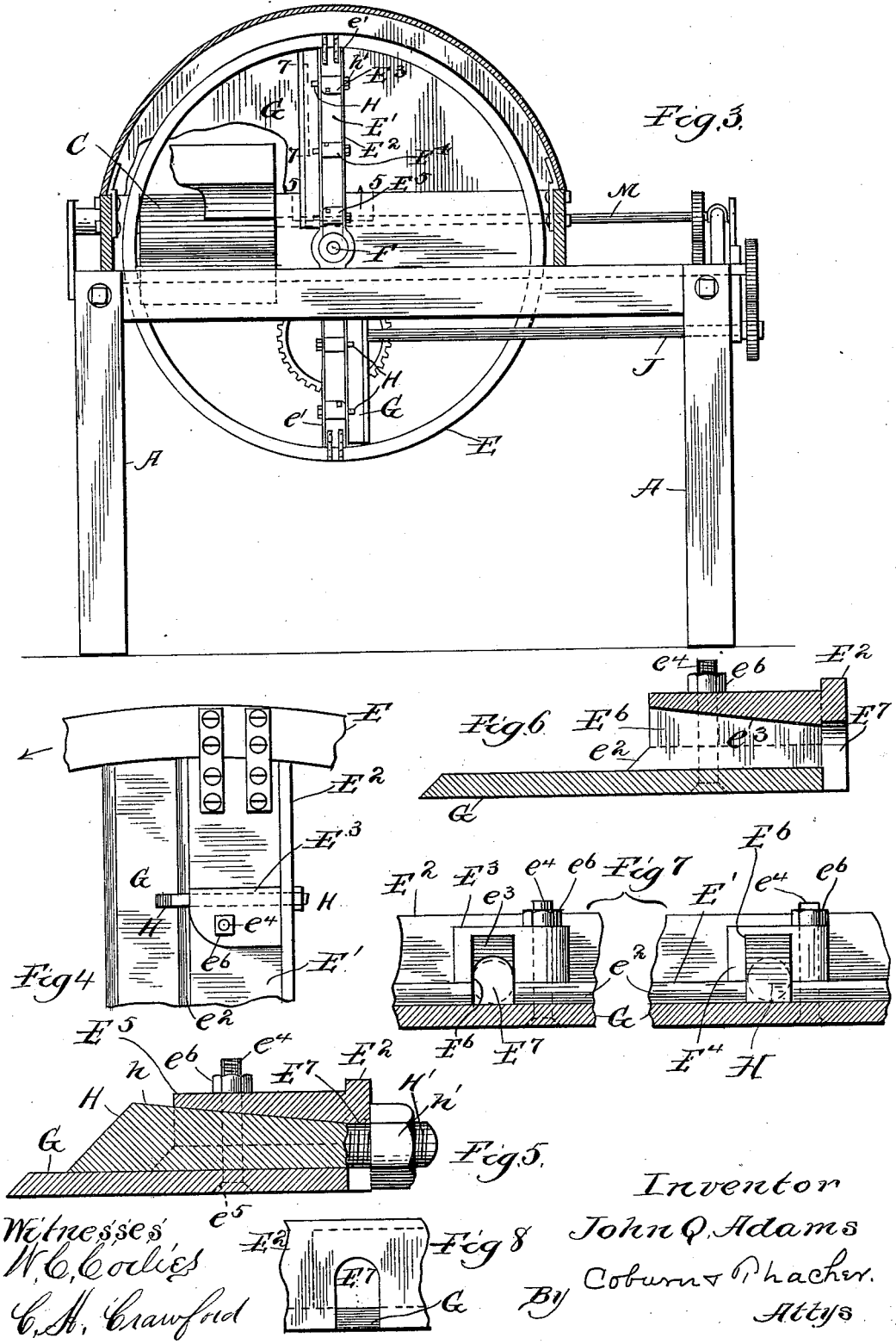
Witnesses
W. C. Coolies
C. H. Crawford
Inventor
John Q. Adams
By Coburn & Thacher
Attys

United States Patent Office.

JOHN Q. ADAMS, OF MARSEILLES, ILLINOIS.

FEED-CUTTER.

SPECIFICATION forming part of Letters Patent No. 565,417, dated August 11, 1896.

Application filed October 12, 1895. Serial No. 565,452. (No model.)

*To all whom it may concern:*

Be it known that I, JOHN Q. ADAMS, a citizen of the United States, residing at Marseilles, in the county of La Salle and State of Illinois, have invented certain new and useful Improvements in Feed-Cutters, which are fully set forth in the following specification, reference being had to the accompanying drawings, in which—

Figure 1:
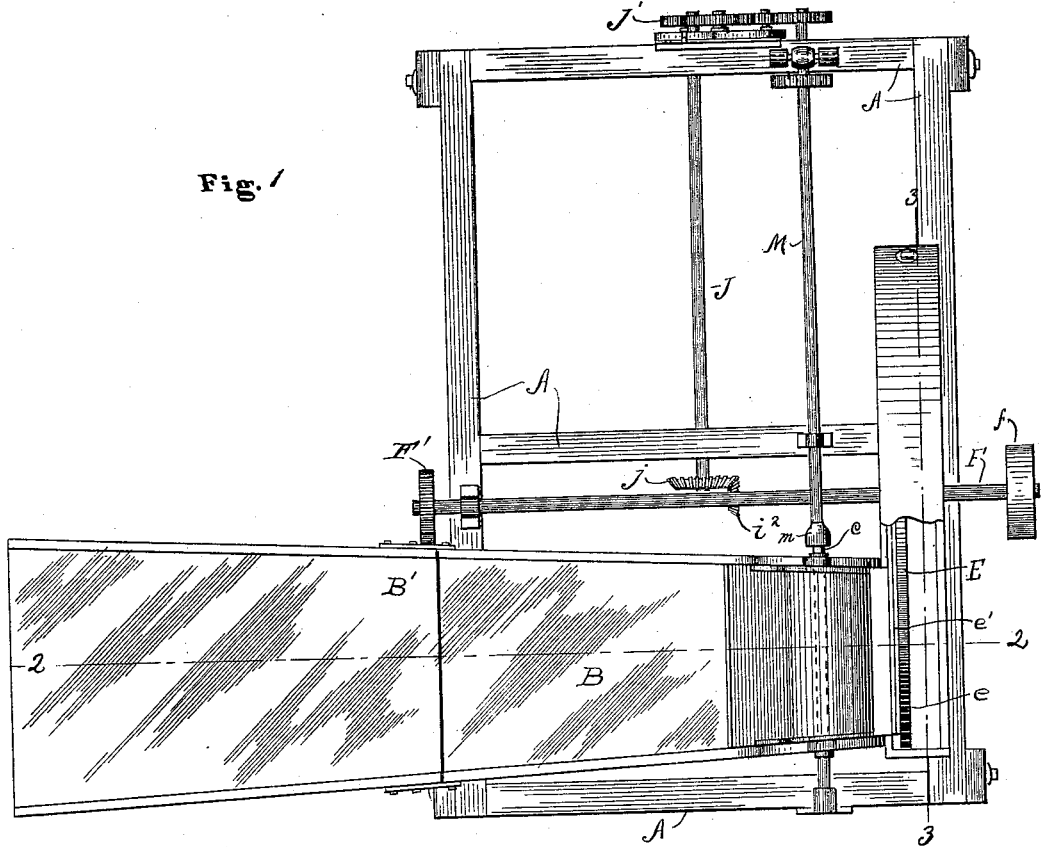
Figure 2:
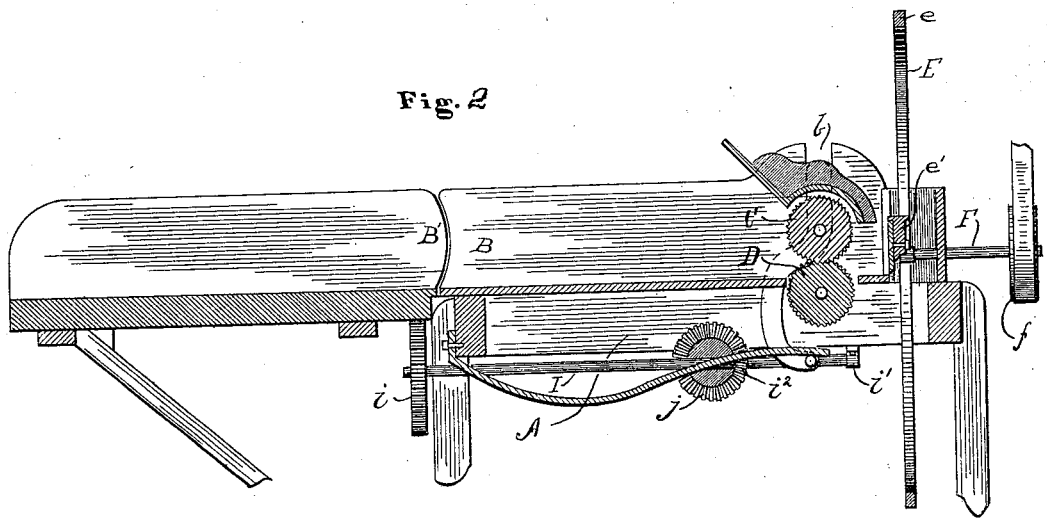

Figure 1 represents a plan view of a feed-cutter embodying my invention. Fig. 2 is a vertical longitudinal section on the line 2 2 of Fig. 1. Fig. 3 is a vertical cross-section on the line 3 3 of Fig. 1. Figs. 4 to 7, inclusive, are detail views of the construction of the carrying-arm and the attachment of the knife thereto. Fig. 4 is an elevation of one end of the said arm and knife. Fig. 5 is a section on the line 5 5 of Fig. 3. Fig. 6 is a similar section with the wedge omitted. Fig. 7 is a section on the line 7 7 of Fig. 3. Fig 8 is a view of a portion of the arm in the rear side thereof.

My invention relates to a machine for cutting up hay for the purpose of preparing feed or fodder. My invention consists in certain improvements in structures of this kind, particularly in reference to the attachment of the knives to the arm of the cutter-wheel.

The main frame A, feed-trough B and extension thereof B', and the upper and lower feed-rollers C and D are, in general construction, substantially the same as in any feed-cutters heretofore used. The cutter-wheel E is keyed upon the front end of a shaft F, mounted in journal-bearings on the main frame a short distance inside the feed-trough, the arrangement of these parts being such that in the revolution of this wheel the knives or cutters radially mounted thereon will pass immediately in front of the discharge end of the feed-trough.

The shaft F is driven from a pulley $f$, mounted on one end thereof, provided at the other end with a gear F', adapted to engage and actuate the gear $i$, mounted upon one end of a second shaft I, which is journaled in suitable bearings $i'$. The shaft I carries a bevel-pinion $i^2$, which engages with a bevel-gear $j$, mounted on a horizontal shaft J. The shaft J by suitable intermediate gearing actuates the shaft M parallel thereto, and so the upper feed-roller C, mounted on the shaft $c$, connected with the shaft M by the universal joint $m$.

The cutter-wheel E comprises a rim $e$ and one or more radial arms $e'$, carrying the knives G. I preferably provide the cutter-wheel with two such arms diametrically disposed, as shown in Fig. 3. The body portion of each of the arms $e'$ consists of a flat bar E', which is shown beveled at its front edge, as at $e^2$, and of the upright flange $E^2$, mounted on the rear edge of the said bar.

At two or more points along the said bar E', preferably at three, are mounted embossments $E^3$, $E^4$, and $E^5$. In other words, the bar E' is reinforced at this point. The bar E' is itself cut away underneath each of these embossments, the said cut extending upward into the embossment itself. There is thus formed within each embossment a recess $E^6$, open upon its lower side, and upon its upper side provided with a sloping roof $e^3$, as shown in Figs. 6 and 7. The upright flange $E^2$ is provided with an aperture $E^7$ in the rear of each of its recesses $E^6$.

The knife-blade G is secured to the under side of the bar E' by bolts $e^4$, the heads of which, $e^5$, are countersunk in the knife-blade, while the bolts themselves extend upward through the embossments and are secured by the nuts $e^6$.

In order to adjust the knife-blade toward and from the arms upon which they are mounted, and so to secure the exact degree of closeness of the said blades to the fixed cutter-bar in conjunction in which they operate, I secure in each of the recesses $E^6$ a wedge-shaped spacing device H, the upper edge of which, $h$, is provided with the same inclination as that of the roof $e^3$ of the said recess. The wedge device H terminates in a screw-threaded shank H', which extends through the aperture $E^7$ in the upright flange $E^2$. When the requisite adjustment has been obtained, the nut $e^6$ is again tightened.

The operation of these devices will readily be seen in connection with the drawings.

When it is desired to adjust the knife-blade G farther from the arm $e'$, and so nearer to the stationary cutter-bar, the nut $e^6$ is loosened and the nut $h'$ is tightened, the result being that the wedge H is drawn inward into the recess and the blade G is forced outward from the cutter-bar and is secured by the nut $h'$.

When it is desired to adjust the whole knife-blade in one direction or the other, all three of the spacing devices in the three embossments will be operated. When only one end of the knife-blade is to be adjusted, only the spacing device at that end will be operated. By this construction I secure very great nicety of adjustment of the knife-blades, which is most desirable to obtain efficiency in such a machine. Furthermore, the adjustment is as simple as it is exact and can be easily and quickly accomplished. Finally, the attachment is secure, each bolt and nut operating to lock the nut upon the adjacent bolt, and vice versa.

Having now described my invention, what I claim, and desire to secure by Letters Patent, is—

1. In a feed-cutter, the cutter-bar $e'$ provided with recesses $E^6$, each formed with a sloping roof $e^3$; the wedges H each formed with an inclined edge $h$ adapted to fit the inclined roof $e^3$; and the knife-blade G secured against the remaining straight edges of the wedges by bolts $e^4$ passing through the knife-blade and the cutter-bar.

2. In a feed-cutter, the cutter-bar $e'$ provided with recesses $E^6$ each formed with a sloping roof $e^3$; the wedges H each provided with one sloping edge $h$ corresponding to the sloping roof $e^3$ and with an opposite straight edge; the screw-threaded shanks $H'$ formed on the ends of the wedges, adapted to receive the nuts $h'$ which bear against the body of the cutter-bar; the knife-blade G; and the bolts $e^4$ passing through the said knife-blade and said cutter-bar and adapted to hold the knife-blade against the straight edges of the wedges.

3. In a feed-cutter, the cutter-bar $e'$ comprising the flat bar $E'$; the upright flange $E^2$ &c., which surrounds a recess, $E^6$, formed with a sloping roof $e^3$ and communicates with the aperture $E^7$ in the upright flange $E^2$; the wedges H each provided with one sloping edge $h$ corresponding to the sloping roof $e^3$ and with an opposite straight edge; the screw-threaded shank $H'$ adapted to pass through the aperture $E^7$ and provided with a nut $h'$ adapted to bear against the flange $E^2$; and the knife-blade G adapted to be secured against the straight edges of the wedges by the bolts $e^4$ passing through said knife, abutting against the flange $E^2$, substantially as described.

JOHN Q. ADAMS.

Witnesses:
G. J. CRAM,
C. H. BOOTH.